March 26, 1940.  W. R. COUGHTRY  2,195,269
CHANGE SPEED TRANSMISSION
Filed Aug. 24, 1939  3 Sheets-Sheet 1

Inventor
William R. Coughtry
By
Blackmore, Spencer & Hind
Attorneys

March 26, 1940. W. R. COUGHTRY 2,195,269
CHANGE SPEED TRANSMISSION
Filed Aug. 24, 1939 3 Sheets-Sheet 2
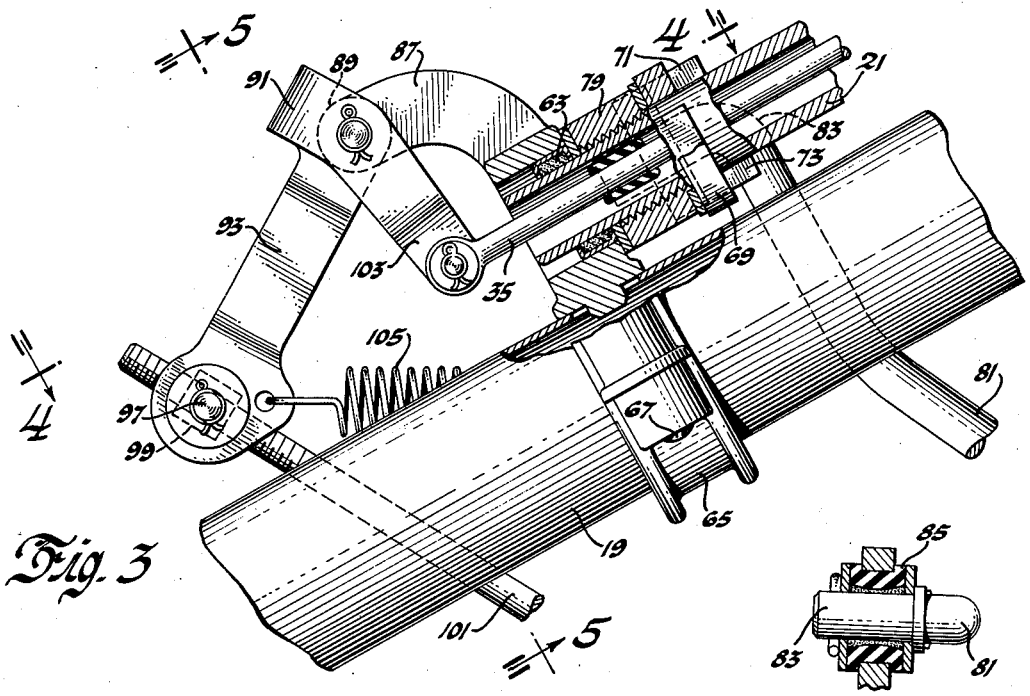
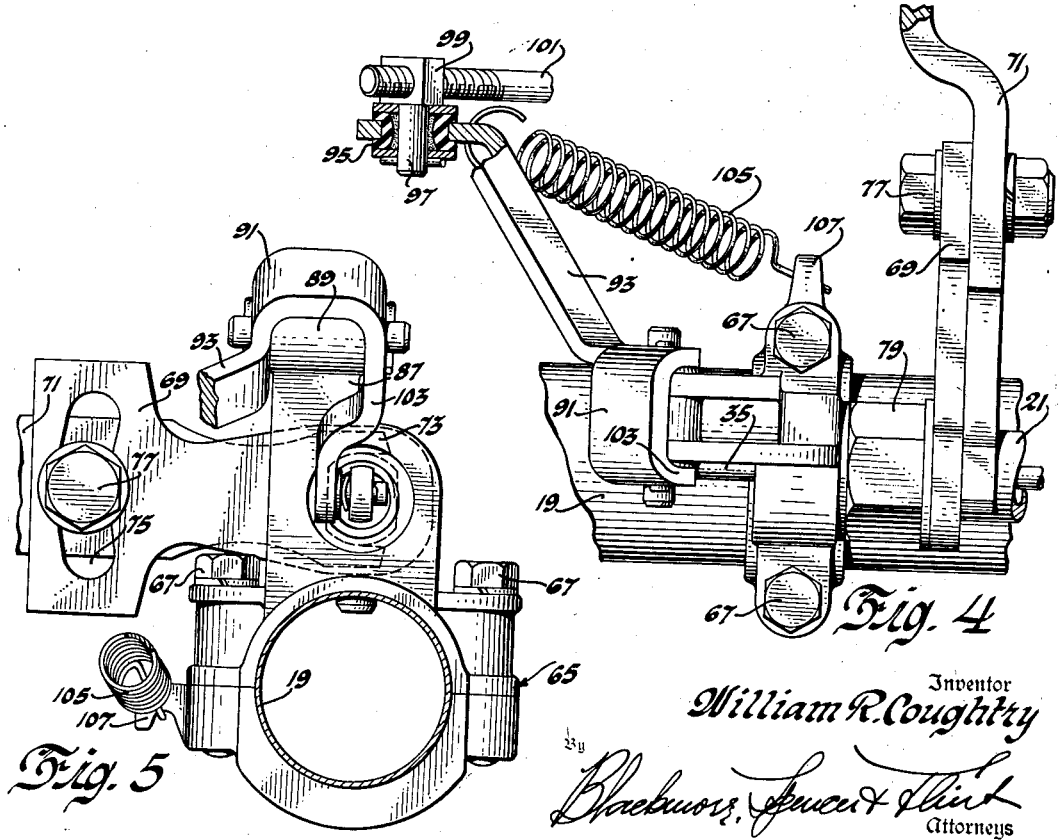
Inventor
William R. Coughtry
By Blackmore, Sweet & Flint
Attorneys March 26, 1940. W. R. COUGHTRY 2,195,269
CHANGE SPEED TRANSMISSION
Filed Aug. 24, 1939 3 Sheets-Sheet 3
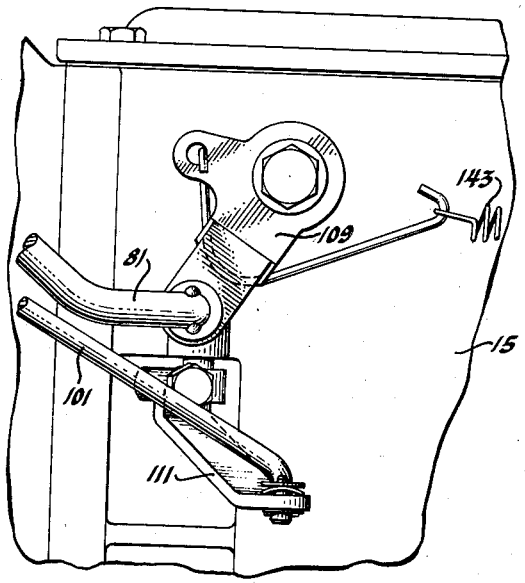
Fig. 6
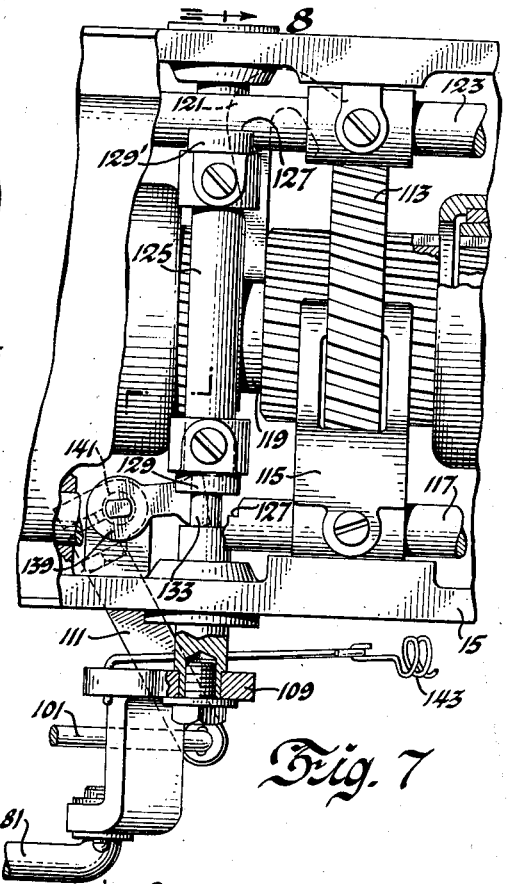
Fig. 7
Fig. 8
Inventor
William R. Coughtry
By
Blackmore, Spencer & Flint
Attorney Patented Mar. 26, 1940

2,195,269

UNITED STATES PATENT OFFICE 2,195,269

CHANGE SPEED TRANSMISSION

William R. Coughtry, Flint, Mich., assignor to General Motors Corporation, Detroit, Mich., a corporation of Delaware Application August 24, 1939, Serial No. 291,675

5 Claims. (Cl. 74—477)

This invention relates to change speed mechanism for motor vehicles and has been designed for changing the gear ratio by manually operable means conveniently located for operation. It provides a so-called remote control wherein novel structural arrangements have been made which constitute the subject matter of this application.

An object of the invention is the avoidance of the conventional shift lever extending from the gear box through the floor of the car body.

A further object is the location adjacent the steering wheel of a manually operable lever which performs the function of the conventional shift lever.

In the accomplishment of the object of the invention certain novel structure has been adopted in the gear box and in the connection between the manually operable lever and the modification within the gear box. The modified construction of the mechanism within the gear housing is more particularly the subject matter of this application.

The invention is illustrated by the accompanying drawings wherein:

Figure 3 is a view in elevation, partly in section, of parts mounted on the steering column.

Figure 4 is a view seen from line 4—4 of Figure 3.

Figure 5 is a section through the steering column showing the gear shifting members in elevation, the view being substantially that seen from line 5—5 of Figure 3.

Figure 6 is an elevation of the side of the changing speed gear housing.

Figure 7 is a top plan view of the same with the cover broken away.

Figure 8 is a section on line 8—8 of Figure 7.

Figure 1:
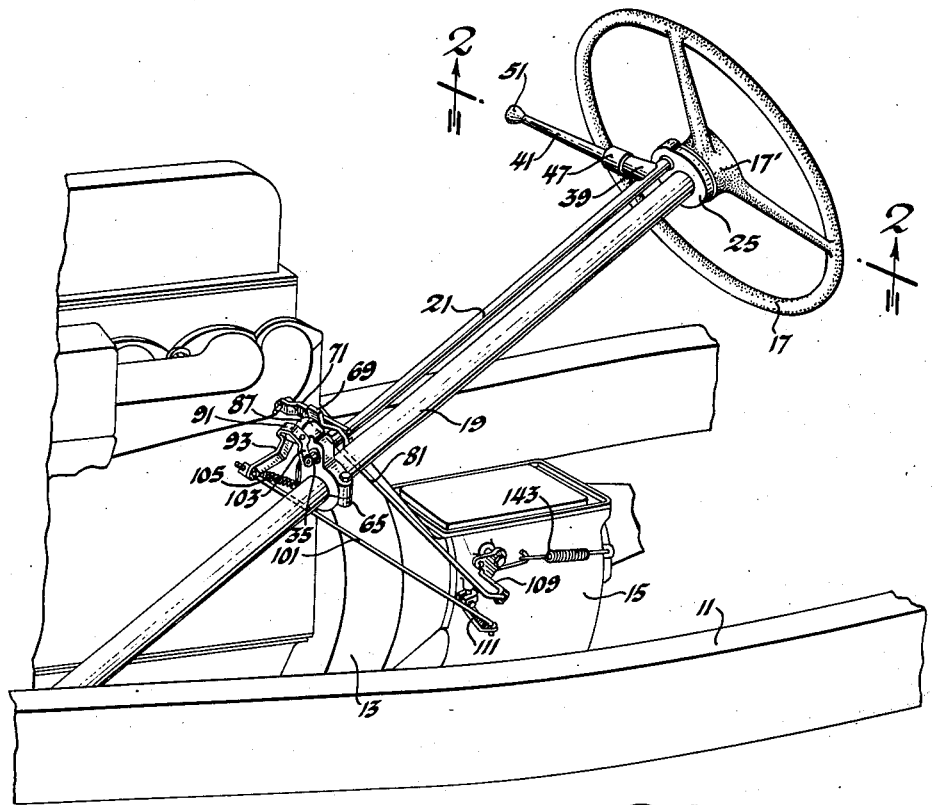
Figure 1 is a perspective view of the assembly used in making gear ratio changes.
Figure 2:
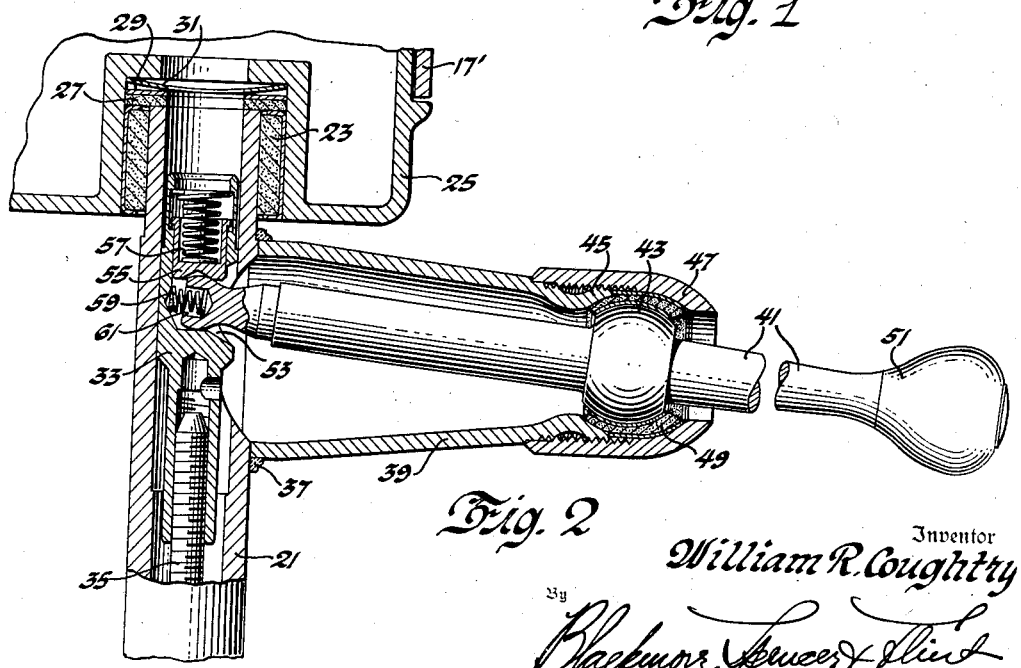
Figure 2 is a section on line 2—2 of Figure 1.

Numeral 11 shows the frame of a motor vehicle, the engine and clutch housing being marked 13 and gear housing represented by numeral 15. The hand steering wheel 17 operates a steering shaft, not shown, within a fixed steering column 19. Alongside the steering column is a tubular shaft 21. Its upper end is rotatably journaled in a bearing 23 located within a recess of the signal switch housing 25, which is fixed in position and relative to which there rotates the hub 17' of the steering wheel. Immediately above the end of shaft 21 there is a thrust washer 27, a steel washer 29 and a bowed spring washer 31, the spring washer engaging the bottom of the recess as shown. A socket member 33 is threaded to the upper end of a rod 35 located within the tubular shaft 21. Welded to shaft 21 as at 37 is a control lever housing 39. Within housing 39 is a lever 41. The lever is provided with a spherical member 43 surrounded by the flared end 45 of the housing 39 and by a cap 47 threaded to the housing. A suitable washer 49 preferably made from lubricant carrying fabric is located between the parts 43 and 47. The lever 41 has a hand knob 51. The work end of lever 41 enters a pocket 53 of the socket member. A cup 55 is pressed axially by a spring 57 in abutment with the end of the socket member, the cup engaging the rounded end of the lever 41. This spring 57 and a spring 59 seated in a terminal recess 61 of the lever and engaging a wall of the socket provide anti-rattling means. It will be evident that since the inner end of the lever is received within the pocket 53 of the socket 33 a vertical reciprocation of lever 41 about fulcrum 43 functions to reciprocate rod 35. This reciprocation of rod 35 is used to make a selection of shift rails as will be explained below. Thereafter lever 41 is rocked horizontally carrying the housing 39 with it and rotates tubular shaft 21 about its axis. This rotation is used to reciprocate the shift rails and thus to position the gears and clutches for the several driving ratios.

The lower end of tubular shaft 21 is journaled in a bearing 63 located within a two-part bracket 65, the parts of which are secured together and to the steering column by fastening means 67. An adjusting lever 69 has a hub portion surrounding the tubular shaft 21. The opening in the hub of lever 69 has one or more flat surfaces engaging like surfaces milled on shaft 21 whereby the lever 69 may not rotate relative to the shaft. Operating lever 71 has a forked end 73 partially surrounding the shaft. The operating lever may be rotated for adjustment purposes about the axis of the shaft and then secured to lever 69 in its selected position, lever 69 having a slot 75 to receive the adjustable securing means 77. The levers are held in their axial position by a nut 79 threaded to shaft 21. A link 81 has an angular end 83 extending through an opening in lever 71. The lever and link are connected by suitable connecting means 85 to accommodate the necessary relative motion therebetween. The bracket 65 has a curved arm 87 terminating in an eye 89 to rotatably support the mid portion of a two-arm lever designated as a whole by numeral 91. One arm 93 of the lever is suitably connected by connecting means 95 with a stem 97 extending from a nut 99 adjustably threaded on the end of a link 101. The other arm 103 extends to the axis of shaft 21 where it is connected to the end of rod 35. A coil spring 105 is connected to an arm 107 of the bracket and also to the end of lever arm 93. This spring biases the hand lever 41 to the position wherein the knob 51 is in its lower position.

Link 81 is connected to the end of a lever 109 adjacent the side of the transmission housing 15. Rotation of lever 109 operates to position the clutches and gears for the several speed ratios. Prior to the rotation of lever 109 a selection is made as between the high speed rail and the low speed rail by a proper rotation of lever 111 through the instrumentality of the before-mentioned link 101. Figure 7 shows only a part of the change speed mechanism. There is a gear 113 slidable axially to effect low speed and reverse driving. This gear is moved by a fork 115 carried by a reciprocable rail 117. The shaft 119 is reciprocable in two directions for engaging a high speed clutch and a second speed clutch. Reciprocation is effected by means of a fork 121 engaging the shaft 119 and carried by a slidable rail 123. The selection of rails is made by reciprocating a selector shaft or rockshaft 125 into positions in which one rail may be reciprocated and the other be locked from reciprocation. Rotation of the selector shaft, after having been reciprocated, produces the reciprocation of the selected rail. The rails have notches 127 on their adjacent sides which notches are adapted to be selectively engaged with arms or cams 129, 129' carried by shaft 125, the engagement being effected selectively by the reciprocating movements of shaft 125. After the engagement of cam 129' with rail 123 as shown in the drawing, shaft 125 is rocked by the rotation of lever 109 mounted on the end of said shaft to effect the clutch engagements for third speed or for second speed. Rockshaft 125 is circular in section. It has grooves 131 and 133. Groove 131 has a rounded contour which corresponds to the outline of rail 123. When the parts are positioned as shown, rail 123 may reciprocate for the reason that groove 131 is in registration with the shaft 123. At the same time that part of shaft 125 outwardly from groove 133 is seen to be located within a groove 135 of rail 117. This groove 135 is rounded to fit the rounded contour of shaft 125. In consequence, rail 117 is held from reciprocation. In a similar manner rail 123 has a groove 137 to cooperate with the full dimensioned part of shaft 125 to prevent reciprocation of rail 123 when rail 117 is being moved. Groove 133 differs from groove 131 in that its reduced portion is of equal depth throughout the length of the groove. This in no way interferes with the reciprocation of rail 117 when the groove 133 is in registration with the rail. The construction provides a suitable end abutment wall which may be engaged by the ends of a lever 139 carried by a vertically disposed rockshaft 141 journaled in the gear casing. Lever 111 referred to above is connected to the end of rockshaft 141 outside the gear housing. When lever 111 is rocked it rotates the rockshaft 141 and the lever 139 moves the rockshaft 125. By making the groove 133 as described the shaft 125 not only functions to reciprocate rail 117 when in one position and to lock it from reciprocation in the other position of adjustment of shaft 125 but the construction provides a very convenient expedient for shifting the rockshaft axially. For convenience in operation a booster spring is shown on the drawing and marked 143.

It is secured to the gear housing and to the lever 109. This spring is under maximum tension when the lever 109 and the shaft 125 are in a position corresponding to the neutral position of the gears and clutches. When the rockshaft is turned in either direction from this neutral position the spring 143 assists in completing the shifting movement.

Briefly described, the operation is as follows: Spring 105 tends to hold the rod 35 in its upper position and the rockshaft 125 in the position shown, the position required for subsequently shifting to high speed and second speed. In this position rail 117 is locked from reciprocation out of its neutral position. Rotation of the hand lever, together with its housing 39, operates to rock shaft 125 through the intermediate linkage, such rockshaft rotation shifting the rail 123 to effect high speed or second speed as the case may be. For low speed and reverse the hand lever 41 is lifted. This pushes rod 35 downwardly and by means of lever 91, rod 101 is pulled to rock lever 111. This causes the rockshaft 141 to rotate on its axis and lever 139, because of its terminal engagement with groove 133 of shaft 125 reciprocates said shaft 125 to lock from rotation in its neutral position shift rail 123 and to release shift rail 117 for reciprocation in response to the subsequent actuation of the hand lever together with its housing.

I claim:

1. In change speed transmission, a reciprocable rail, means associated with said rail to introduce a plurality of driving ratios, a reciprocable selector shaft extending at right angles to said rail, said selector shaft having an arm to operably engage and reciprocate said rail in response to selector shaft rotation in a selected position of axial reciprocation, said selector shaft having a groove of uniform depth, said groove being in the path of movement of said rail when said selector shaft is in said selected position, said rail having a curvilinear recess to receive a part of said selector shaft disposed axially from its groove in a second position of axial reciprocation of said selector shaft to prevent reciprocation of said rail, and means to axially reciprocate said selector shaft comprising a lever having an end located in said selector shaft groove.

2. In change speed transmission, a reciprocable rail, means associated with said rail to introduce a plurality of driving ratios, a reciprocable selector shaft extending at right angles to said rail, said selector shaft having an arm to operably engage and reciprocate said rail in response to selector shaft rotation in a selected position of axial reciprocation, said selector shaft having a groove of uniform depth, said groove being in the path of movement of said rail when said selector shaft is in said selected position, said rail having a curvilinear recess to receive a part of said selector shaft disposed axially from its groove in a second position of axial reciprocation of said selector shaft to prevent reciprocation of said rail, and means to axially reciprocate said selector shaft comprising a rockshaft, a lever extending therefrom and entering the groove of the selector shaft, said rockshaft having a second lever arm whereby it may be rotated.

3. In change speed mechanism, shift rails, a selector shaft extending transversely of said rails, said rails having notches on adjacent faces and said selector shaft having arms to selectively engage said notches in response to axial reciprocation thereof, said rails having rounded grooves to receive said selector shaft slidably and selectively whereby the engagement of said selector shaft with the groove of one of said rails prevents reciprocation of that rail, said selector shaft formed with grooves located adjacent the arms to selectively register with that rail the notch of which is engaged by the arm of the selector shaft, one of said selector shaft grooves being of uniform depth and means including a lever projecting into said last named groove to reciprocate said selector shaft.

4. In change speed mechanism, shift rails, a selector shaft extending transversely of said rails, said rails having notches on adjacent faces and said selector shaft having arms to selectively engage said notches in response to axial reciprocation thereof, said rails having rounded grooves to receive said selector shaft slidably and selectively whereby the engagement of said selector shaft with a groove of one of said rails prevents reciprocation of said rail, said selector shaft formed with grooves located adjacent the arms thereof to selectively register with said rails in response to said reciprocation, means to reciprocate said selector shaft including a movable part entering one of said selector shaft grooves.

5. In change speed transmissions, two parallel reciprocable rails, means associated with said rails and operable in response to movements thereof from predetermined positions for activating a plurality of driving ratios, a reciprocable and rotatable selector shaft extending at right angles to said rails, lever arms on said selector shaft adapted to selectively engage said rails as the selector shaft is reciprocated, said rails having formations to register with said selector shaft in said predetermined positions, said selector shaft having grooves, one adjacent each lever arm, each said groove being adapted to register with the adjacent rail simultaneously with the engagement of the lever arm with that rail, means to rotate said selector shaft, and means to reciprocate said selector shaft and including a movable part entering one of said selector shaft grooves.

WILLIAM R. COUGHTRY.